United States Patent [19]

Burke et al.

[11] 4,402,905
[45] Sep. 6, 1983

[54] PRODUCTION OF A POLYCRYSTALLINE SILICON ALUMINUM ALLOY BY A HOT PRESSING TECHNIQUE

[75] Inventors: Michael A. Burke, Pittsburgh; Robert E. Gainer, Monroeville, both of Pa.

[73] Assignee: Westinghouse Electric Corp., Pittsburgh, Pa.

[21] Appl. No.: 355,071

[22] Filed: Mar. 5, 1982

[51] Int. Cl.³ .......................... B22F 1/00; B22F 3/14; B22F 9/04

[52] U.S. Cl. ........................................ 419/10; 419/23; 419/31; 419/33; 419/47; 419/48; 420/537; 420/578; 148/403; 75/0.5 B; 357/67 R

[58] Field of Search ................ 75/213, 201, 226, 211, 75/200, 0.5 B; 148/403; 420/537, 578; 419/10, 23, 31, 33, 47, 48; 357/67 R

[56] References Cited

U.S. PATENT DOCUMENTS

| | | | |
|---|---|---|---|
| 3,925,808 | 12/1975 | Rai-Choudhury | 357/67 |
| 4,059,441 | 11/1977 | Ray et al. | 75/174 |
| 4,135,922 | 1/1979 | Cebulak | 420/537 X |
| 4,297,135 | 10/1981 | Giessen et al. | 75/123 B |

OTHER PUBLICATIONS

Bendijk, A. et al., "Characterization of Al–Si–Alloys Rapidly Quenched from the Melt", *J. of Matl. Sci.*, Nov., 1980, pp. 2803–2810.

Guy, Albert G., *Elements of Physical Metallurgy*, 2nd Ed. 1967, Addison-Wesley Pblshng. Co., Reading, Mass., pp. 182–188.

*Primary Examiner*—Brooks H. Hunt
*Assistant Examiner*—Matthew A. Thexton
*Attorney, Agent, or Firm*—C. L. Menzemer

[57] ABSTRACT

The present invention is directed to a process for preparing a body of polycrystalline silicon doped with aluminum comprising melting a mixture of silicon powder and aluminum powder, rapidly quenching the melt, grinding the solidified silicon-aluminum alloy and hot pressing to form a compact.

2 Claims, 1 Drawing Figure

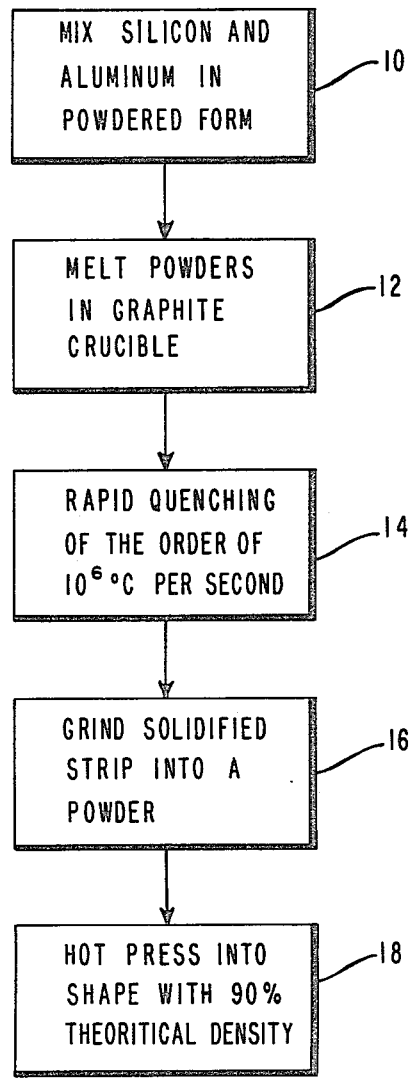

PRODUCTION OF A POLYCRYSTALLINE SILICON ALUMINUM ALLOY BY A HOT PRESSING TECHNIQUE

BACKGROUND OF THE INVENTION

1. Field of the Invention:

The present invention is in the field of powdered metallurgy generally and is specifically directed to the field of forming compacts of polysilicon by hot pressing.

2. Description of the Prior Art:

Past attempts to produce polycrystalline silicon by hot pressing low grade silicon powders with small additions of powered aluminum has resulted in very porous members. It would appear that hot pressing of silicon powders can only be satisfactorily accomplished at very high pressures of the order of 28,000 psi. One reason for the low density of the hot pressed product is the heterogeneous distribution of the aluminum particles in the product.

SUMMARY OF THE INVENTION

The present invention comprises a process for forming a hot pressed silicon member comprising, forming an admixture of a predetermined amount of silicon and aluminum powder, melting said admixture, rapidly quenching the melt to form a solid member, grinding said member into a powder and hot pressing said powder into a predetermined shape.

BRIEF DESCRIPTION OF THE DRAWING

For a better understanding of the present invention, reference should be had to the following detailed discussion and drawing, the sole FIGURE of which is a block flow diagram.

DESCRIPTION OF THE PREFERRED EMBODIMENT

In accordance with the teachings of this invention, and with reference to the FIGURE, silicon powder and aluminum powder are admixed in a graphite crucible designated as 10 in the FIGURE.

The silicon powder can be that usually referred to as low grade silicon, that is silicon of 99.9% purity. The size of the silicon powder is not critical to this invention. The aluminum should have a purity of at least 99.9%. The particle size is not critical to this invention, The aluminum powder comprises from 2% to 8%, by weight, of the aluminum power-silicon powder admixture.

Preferably, the aluminum comprises 4%, by weight, of the aluminum-silicon powder admixture.

The aluminum-silicon powder admixture is placed in a graphite lined quartz crucible and melted in an induction heating furnace. A temperature of 1450 to 1500 is required to ensure complete melting and the temperature is maintained for up to five minutes. The silicon and aluminum powder are actually melted by contact with the graphite. The melt step is designated as 12 in the FIGURE.

The melt is then quenched rapidly, cooling at a rate of the order of $10^{6°}$ C./second. Quenching is designated as 14 in the FIGURE.

Such rapid quenching is affected by forcing the silicon-aluminum melt through an orifice, having a diameter of from 0.04 to 0.075 inch, and onto a copper disk rotating at a rate of 800 rpm which is equivalent to approximately 50 feet per second. An excess pressure of 2 to 3 psi of Argon is used to force the melt through the orifice.

The silicon-aluminum liquid flattens on the copper disk and solidifies in the form of a thin strip.

The density of the final hot pressed member is facilitated by a fine distribution of the aluminum in the silicon.

The aluminum is practically insoluble in solid silicon. The microstructure of the solidified melt consists of silicon dendrites approximately 5 $\mu$m across separated by very fine films of aluminum, rich low melting point silicon-aluminum entactic phase.

The rapid cooling or quenching results in a fine distribution of the aluminum in the silicon.

The strip of silicon-aluminum formed by the rapid quenching is then ground into a powder having fragment sizes up to 30 mesh. Powdering is designated as 16 in the FIGURE.

The powder thus formed is then hot pressed in steel molds into a desired shape. The hot pressing is carried out at a temperature of from 1350° C. to 1450° C. and a pressure of from 3750 psi to 4250 psi for a time ranging 20 minutes to 60 minutes. The hot pressing is designated as 18 in the FIGURE.

Preferably, the powder is hot pressed at 4000 psi and 1400° C. for about 40 minutes.

The process of this invention has been used to form wafer like members having a diameter of 2 inches and a thickness of 60 mils. The wafers thus formed had a density equal to 90% of the theoretical density.

The wafers were satisfactory for use as substrates for power semiconductor devices.

We claim as our invention:

1. A process for forming a hot pressed member comprised of polysilicon and aluminum, consisting of: forming an admixture of powdered silicon and aluminum, said admixture consisting of from 2% to 8%, by weight aluminum, remainder silicon, melting said powder admixture, rapidly quenching said melt at a rate of the order of $10^{6°}$ C. per second, to form a solid, grinding said solid to a powder having fragment sizes up to 30 mesh and hot pressing said powder, at a temperature of from 1350° C. to 1450° C. and at a pressure of from 3750 psi to 4250 psi, into a predetermined shape having a density equal to 90% of theoritical density.

2. The process of claim 1 in which the hot pressing is carried out at a temperature of 1400° C. and 4000 psi for about 40 minutes.

* * * * *